(12) United States Patent
Dotson

(10) Patent No.: US 6,471,933 B1
(45) Date of Patent: Oct. 29, 2002

(54) OZONE-OXIDIZED CARBON BLACK COMPOSITION WITH LOW CONDUCTIVITY AND IMPROVED COLOR

(76) Inventor: Anderson Oliver Dotson, 765 Barnes Rd., Monroe, LA (US) 71203

(*) Notice: Subject to any disclaimer, the term of this patent is extended or adjusted under 35 U.S.C. 154(b) by 0 days.

(21) Appl. No.: 08/806,851

(22) Filed: Feb. 26, 1997

Related U.S. Application Data

(63) Continuation of application No. 08/391,608, filed on Feb. 21, 1995, now abandoned.

(51) Int. Cl.$^7$ ................................................. C09C 1/56
(52) U.S. Cl. ................................. 423/449.5; 423/449.1
(58) Field of Search ..................... 204/173; 423/449.1, 423/449.5

(56) References Cited

U.S. PATENT DOCUMENTS

| | | | |
|---|---|---|---|
| 2,682,448 A | 6/1954 | Cines | 23/209.1 |
| 3,216,843 A | 11/1965 | Heller et al. | 106/307 |
| 3,245,820 A | 4/1966 | Melore et al. | 106/307 |
| 3,247,003 A | 4/1966 | Pollock | 106/307 |
| 3,279,935 A | 10/1966 | Daniell et al. | 106/307 |
| 3,301,694 A | 1/1967 | Kraus et al. | 106/307 |
| 3,318,720 A | 5/1967 | Johnson et al. | 106/307 |
| 3,330,799 A | 7/1967 | Voet et al. | 260/41.5 |
| 3,353,980 A | 11/1967 | Johnson | 106/307 |
| 3,364,048 A | 1/1968 | May et al. | 106/307 |
| 3,523,812 A | 8/1970 | Kraus | 106/307 |
| 3,565,657 A | 2/1971 | Dannenberg et al. | 106/307 |
| 3,620,792 A | 11/1971 | Hagoplan | 106/307 |
| 3,642,446 A | 2/1972 | Heller et al. | 23/209.4 |
| 3,957,949 A | 5/1976 | Senjo et al. | 423/235 |
| 3,992,218 A | 11/1976 | Suetsugu et al. | 106/307 |
| 4,100,421 A | 7/1978 | Tabata et al. | 250/533 |
| 4,139,595 A | 2/1979 | Vaseen | 423/393 |
| 4,233,126 A | 11/1980 | Garcia | 204/157 |
| 4,256,710 A | 3/1981 | Azuma et al. | 423/210 |
| 5,030,334 A * | 7/1991 | Hale | 204/401 |
| 5,034,198 A | 7/1991 | Kaiga et al. | 422/186.07 |

FOREIGN PATENT DOCUMENTS

| | | | |
|---|---|---|---|
| CA | 531567 | 10/1956 | 423/449.5 |
| CA | 750297 | 1/1967 | 423/449.5 |
| GB | 663237 | 12/1951 | 423/449.5 |
| JP | 49-011998 | 3/1974 | 423/449.5 |
| JP | 3-124772 | 5/1991 | 423/449.5 |
| SU | 231688 | 2/1974 | 423/449.5 |

* cited by examiner

*Primary Examiner*—Stuart L. Hendrickson

(57) ABSTRACT

A process for the ozone—oxidation of a carbon black is disclosed. The process employs a gas stream which comprises air and ozone, the type of gas stream typically generated by means of a corona discharge. The ozone—oxidized carbon black is generated by scrubbing (or, intimately contacting) the gas stream with water prior to mixing it with the carbon black. By performing the process disclosed herein, an oxidized carbon black having low electrical conductivity and excellent color properties results.

16 Claims, No Drawings

OZONE-OXIDIZED CARBON BLACK COMPOSITION WITH LOW CONDUCTIVITY AND IMPROVED COLOR

This is a continuation of application Ser. No. 08/391,608 filed on Feb. 21, 1995, now abandoned.

FIELD OF THE INVENTION

This invention relates to ozone—oxidized carbon blacks and the methods of producing them.

BACKGROUND OF THE INVENTION

Carbon black is the accepted generic name for a family of small particle size carbon pigments which are formed in the gas phase by the thermal decomposition of hydrocarbons. Carbon blacks are currently sold in the form of more than 100 different commercial grades which vary in their particle size, aggregate structure, porosity, and surface chemistry.

Historically, carbon blacks have been manufactured by five different major processes: the lampblack process, the impingement process, the acetylene black process, the thermal black process, and the oil furnace process. The process used to manufacture the carbon black is extremely important; indeed, the manufacturing process frequently has more of an impact on the product and its final characteristics than the raw material from which it is made.

The lampblack process is the oldest of all the processes and is now practically obsolete in the U.S. and most other locations. Lampblacks are made by burning aromatic oils such as naphthalene, anthracene, or creosote. Typically, the oil is burned in shallow pans with limited air supply and the carbon black formed is drawn off into settling areas and collected periodically. This is a low temperature operation and the particle size tends to be fairly large (about 70 to about 100 nm average diameter) and highly aggregated to produce a stringy chain structure.

Impingement (or "channel") process carbon blacks were first produced during the 1870's and reached their peak production in the 1920's and 1930's. In this process, natural gas (typically reinforced with a vapor of hot oil) was burned from slotted lava tips to produce fan—type flames in evenly spaced rows. These were set to impinge on channel irons on which the carbon black was deposited. During exposure to air on the hot channel irons, the carbon black becomes highly oxidized (e.g., 2.5 to 3.5% oxygen content). This high level of oxygen, obtained without resorting to a post treatment, is unique among the different carbon black processes. The combination of the natural gas feedstock and cooling without quench water also provides for a very low inorganic content. Unfortunately, the process is relatively inefficient in its use of increasingly expensive natural gas and it severely pollutes the atmosphere. Thus, it too has fallen into the same category as the lampblack process and is little used in the U.S. Carbon blacks with high oxygen surface functionality are now generally produced by post chemical oxidation of oil furnace products.

In the acetylene black process, carbon black is made from the thermal decomposition of acetylene gas. In one common embodiment, acetylene gas is introduced at the top of a cylindrical reactor which is several meters high. The reactor is preheated to about 800° C. to decompose the acetylene. This is a rather violent exothermic reaction which produces temperatures up to about 3000° C. Proceeding from the entry point of the acetylene gas down into the upper part of the furnace there is a temperature gradient of about 3000° C. Carbon black formation most likely takes place in the 800 to 2000° C. zone, followed by partial graphitization in the higher temperature region. Air enters into the bottom of the reactor and acts to combust the hydrogen that is formed. In addition, the air flow prolongs the residence time of the acetylene black aggregates in the hot zone of the reactor which eliminates any residual hydrocarbons and further unifies the highly graphitic microstructure of the final product. Acetylene black is also produced commercially by the thermal decomposition of acetylene gas in stainless steel retorts which are water cooled. Because of its highly graphitic surface, acetylene black exhibits low reactivity and contains a very low level of oxygen volatile. This type of carbon black is frequently used in conductive applications.

Thermal blacks are manufactured by the decomposition of natural gas or oil. They are made in the absence of air by means of a batch type process which is based on sets of dual furnaces (generators). The generators are lined with an open checker brickwork which is preheated prior to charging them with the gas or oil feedstock. The respective heat and make cycles commonly require a few minutes each. Following the make cycle, there is a one—minute steam purge to remove the carbon black, which is then water quenched, passed through the collection filter, and air conveyed to the beader, dryer, and bulk storage loading tank. Following the purge to remove the carbon black, air is passed through the system and carbon remaining on the walls of the generators is burned off to produce additional heat for the next make cycle. Thermal blacks are uniquely large in size (250 to 500 nm average particle diameter) and low in structure (aggregation) relative to all other types of carbon black. They are typically used in cross—linked polyethylene and in rubber applications requiring very high filler volume fractions, or in costly specialty polymers sensitive to degradation with other carbon black grades.

Most of the carbon black grades available today are made by the oil furnace process, which involves the decomposition of highly aromatic oil feedstock in a heated reactor. This is a very rapid, continuous process in which the oil is converted to carbon black aggregates in a few milliseconds. The feedstock oil from storage tanks is injected into the reactor which is heated continuously with a mixture of fuel (oil or gas) and air. The carbon black is water—quenched immediately after formation and then further cooled as it passes through a heat exchanger and on through the bag filter and into the beaders, dryer, and storage tank. Because of the very high gaseous flow rates, the carbon black aerosol may reach the bag collector in less than a second after being injected as oil into the reactor.

A considerable amount of process water is used to quench, cool, and bead the carbon black during the furnace black process. Rubber grade carbon blacks typically require 6 to 8 pounds of water for every pound of carbon black produced. Very small particle size high color carbon blacks for industrial applications (e.g., Raven 5000) require a process water—to—carbon black ratio of more than 40 to 1. A high percentage of the furnace black production is pelletized (beaded) to provide a more easily handled and dust free form. Carbon blacks utilized in rubber and plastics applications are most typically beaded with water which provides denser, more durable beads that are most suitable for transporting the black as a free—flowing powder through bulk handling systems. Rubber and plastics compounding is typically based on high shear Banbury or roller mill mixing which is ideally suited for wet beaded carbon blacks. However, many industrial applications such as inks and coatings utilize low energy mixing procedures. These applications can only accommodate powder and dry beads which are more easily broken down and dispersed in liquid vehicle systems. Dry beads are formed by slowly tumbling the powdered carbon black in a rotating drum. Agglomerates of carbon black act as nuclei, and growth into beads takes place slowly as concentric layers of black are progressively added.

As stated above, most of the carbon blacks available today are made by the oil furnace process. This invention is preferably applied to carbon blacks originally made by this process, although it may be applied to carbon blacks made by the other processes as well.

It has long been recognized that oxidized carbon blacks (carbon blacks treated so as to have oxygen—containing functional groups at the surface) feature characteristics which are important to specific applications. For example, in paint, ink, toner, and coatings applications, oxidized carbon blacks provide improved wettability and rheology, characteristics which are important in these applications.

In some of these applications, users of oxidized carbon blacks have an additional requirement: low electrical conductivity. This characteristic is important for a number of reasons. For example, there are a number of inorganic species, commonly associated with high electrical conductivity, which are believed by the inventor to affect both (a) the stability of liquid dispersions and (b) the weatherability of finished products in coatings applications (e.g., paints).

BRIEF SUMMARY OF THE INVENTION

Disclosed herein is a process for the ozone—oxidation of a carbon black. The process comprises the following steps. First, a gas stream comprising air and ozone is produced. Second, the produced gas stream is "water scrubbed" (or, intimately contacted with water) for a predetermined interval of time. Third, the carbon black is thoroughly mixed with the previously water—scrubbed gas stream for a predetermined period of time.

In the preferred embodiment, the gas stream is one made by subjecting a gas stream comprising air to the ozone—generating action of a corona discharge. In the usual case, the gas stream which results comprises ozone in a concentration of less than about 4 per cent by weight. Water scrubbing this ozone—enriched gas stream for a period of not less than about 2 seconds has the effect, it is believed, of removing nitrogen oxides generated during the ozonation process. Although the corona discharge method of ozone generation has been known by carbon black producers for years, it has never before been recognized that water scrubbing the ozone—enriched gas stream yields a carbon black with superior properties for color applications.

DETAILED DESCRIPTION OF THE PREFERRED EMBODIMENT

The Carbon Blacks to Which This Invention Applies

Four of the fundamental properties of carbon blacks are its fineness (i.e., its particle size); its structure; its porosity; and its surface chemistry. These fundamental properties define the unique nature of the numerous carbon blacks available and their respective utilities in various applications. A number of other non—fundamental properties (e.g., surface area, tint strength, oil absorption, to name a few) are related to these fundamental properties and are useful in defining a black's characteristics.

A number of carbon blacks, termed medium and high color carbon blacks, are used in enamels, lacquers, and plastics for their jetness and tinting strength (discussed below). Because the fineness of the carbon black is an important property in these applications, most of the industrial color blacks useful in the practice of the invention feature a very small particle size (e.g., typically, from about 6 nm to about 30 nm, as measured by the Transmission Electron Microscopy/Automated Image Analysis, ASTM 3849, method).

A number of these fine color carbon blacks may be specially post treated to provide high levels of surface oxygenates to provide the specific advantages discussed above. As an example, among the commercial color carbon blacks so treated are those commonly known in the art as Raven™ carbon blacks. These oxidized color carbon blacks include the following: Ravens™ 7000, 5750, 5250, 5000, 3500, 1255, 1080, 1060, 1040, 1035, and 14.

When carbon blacks are surface treated, a test is needed to determine the effectiveness and the extent of the surface treatment. One test used to indicate the amount of oxygen—related groups present on a given grade of carbon black is the percent oxygen determination. This determination represents the weight loss which occurs when a dried sample is heated to a high temperature in an inert atmosphere. Dried samples of from about 20 to about 100 mg of carbon black are heated in an induction furnace to about 1000° C. while being purged with a stream of argon. The oxygen on the sample is released as CO or $CO_2$ and the concentration is determined using an infrared detector, e.g., a LECO Model RO-416DR oxygen analyzer.

The carbon blacks to be produced by the inventive process disclosed are ozone—oxidized (by a specially formulated ozone—enriched gas stream), so that they have a percent oxygen measure of from about 3.0 percent oxygen to about 10.0 percent oxygen, preferably from about 5.5 percent oxygen to about 9.5 percent oxygen.

The electrical conductivity of all of the carbon blacks used and treated herein was measured by placing about 5 grams of the black into a beaker to which 100 ml of deionized distilled water was added. The water/carbon black sample was then boiled for 5 minutes. The sample was cooled to room temperature, and the water lost to evaporation was replaced. Each sample would then be filtered through Whatman #40 filter paper, and the conductivity of the filtrate measured at 25° C. using a Y51 Model 33 conductivity meter.

The three primary attributes of carbon black in color applications are its jetness (i.e., its degree of "blackness"), its tint strength (i.e., its ability to modify the intensity of other pigments through tinting), and its tint tone or masstone (i.e., the undertone imparted by the carbon black).

The tinting strength of a color carbon black is usually tested by mixing a small amount of the carbon black into a larger amount of a white pigment, usually a zinc oxide or titanium dioxide, in an oil or resinous vehicle, to give a gray paste. The diffuse reflectance of the paste is then measured. A carbon black with high tinting strength has a high light absorption coefficient and a low reflectance value. The tinting strength is described in terms of ASTM D 3265.

The jetness and tinting strength can be measured quantitatively using instrumental analysis by methods well known by those skilled in the art. The Hunter color space is commonly employed to split the three—dimensional color space into three orthogonal components:

| | | |
|---|---|---|
| L = 0 ("jet" black) | to | L = 100 (white); |
| −a (green) | to | +a (red); and |
| −b (blue) | to | +b (yellow). |

The coordinates L, a, and b are calculated automatically using modern instruments. The inventor employed a Hunter Lab Compuscan reflectance spectrometer with 0/45 geometry to generate the measurements disclosed herein.

"Water Scrubbed" Ozone Oxidation of Carbon Black

Industrial ozone is actually a dilution of ozone in a relatively large volume of air or oxygen. Although ozone may be produced in a variety of ways, one of the oldest and best adapted techniques for the production of ozone on a large scale is by means of a corona discharge.

A corona discharge is a silent electrical discharge which is used to accelerate electrons so as to give them sufficient kinetic energy to split the oxygen—oxygen double bond upon impact with the oxygen molecule. Although not wanting to be bound by theory, it is believed that the two oxygen atoms, which are formed from this collision, react with another oxygen molecule to form ozone.

The corona discharge method of producing ozone from air is well known in the art. In fact, the pungent odor of ozone was first reported by Van Maurm in 1785 in the vicinity of an electrical discharge. Numerous, effective, commercial ozonators are available on the market. The inventor has found that Welsbach ozonators provide for efficient production of ozone at low cost. These ozonators produce, from an air feed, an ozone—enriched air stream with an ozone concentration of less than about 4%, usually about 1%, by weight. An alternative approach is to employ an oxygen feed, instead of an air feed, which results in the production of an ozone—enriched oxygen stream with an ozone concentration of less than about 8%, usually about 2%, by weight.

In the corona discharge production of ozone using air as the feed, nitrogen and oxygen are present. As a result, nitrogen molecules also are impacted by the discharged electrons and, as a result, different states of nitrogen oxides ($NO_x$) are formed. Although not wanting to be bound by a particular theory, it is believed that, in a strong oxidation environment, all states of $NO_x$ (i.e., $NO$, $NO_2$, and $NO_3$) are oxidized to the most highly oxidized state, here nitrogen pentoxide ($N_2O_5$), which is the form normally found at the exit of ozone generators. Thus, the ozone—enriched air produced by the ozonator will largely contain air, ozone and $N_2O_5$. The molar ratio of ozone to $N_2O_5$ under typical conditions is on the order of about 100 to 1. $N_2O$ may also be formed, but, since it is generally inert in its effect on the carbon black, its presence is ignored.

It has been recognized for some time that, if the air supplied to the ozonator is "wet" (i.e., contains water vapor), the $N_2O_5$ reacts quickly and completely with the water to form nitric acid ($HNO_3$). This is frequently deposited on the solid surfaces of the ozonator and piping, where it causes severe corrosion. For this reason, ozone is invariably produced using very dry gas. Maintenance of a gas feed dew point of 60° F. is commonly recommended.

The use of dry feed gas has allowed producers of ozone—oxidized carbon black to essentially ignore the presence of nitrogen pentoxide ($N_2O_5$) in the ozone—enriched gas streams employed. Although not wishing to be bound to a particular theory, the inventor has discovered that, by taking steps to remove these overlooked nitrogen oxides, including nitrogen pentoxide ($N_2O_5$), from the ozone, a surprisingly useful carbon black results.

To remove the nitrogen oxides from the ozone—enriched air stream, the inventor "water scrubs" the ozonator discharge gas before allowing the ozone to contact the carbon black. The resulting carbon black has a lower electrical conductivity and improved color properties.

The "water scrubbing" referred to above refers to establishing an intimate contact between the gaseous ozone—enriched air and water for a predetermined effective discrete interval of time. The likely mechanism by which this contacting is effected is any of the commercial countercurrent gas—liquid contactors known to those skilled in the art.

Ozone—treatment of the carbon black is effected in a horizontal treatment drum. The drum is equipped with spargers which extend below a bed of carbon black. It is through these spargers that the ozone is transferred, so as to intimately and thoroughly contact the carbon black. Thus, the ozone—water contactor referred to above would be located in the ozone line prior to the ozone's entry into the treater drum.

High concentrations of ozone (e.g., 8 to 16 per cent by weight) and pure ozone have been recommended in various uses of the gas. However, the inventor has found that the range of about 1 to about 2 per cent by weight accomplishes the desired result of the invention and does so in an economic fashion. Thus, the use of ozone—enriched gas streams comprising ozone in a concentration of less than about 8 per cent by weight, and preferably from about 1 to about 2 per cent by weight, is recommended.

COMPARATIVE EXAMPLE 1

A quantity of Raven™ 5000 carbon black was oxidized using different ozone—enriched gas streams for comparison. The first stream was a stream of ozone—enriched air. The second stream was a stream of ozone—enriched oxygen. Neither of these gas streams was "water scrubbed" in accordance with the recommendations of the invention. Samples from the same batch of carbon black were treated with each stream.

TABLE A

Comparison of R5000 Carbon Blacks Resulting from Unscrubbed Ozone-Enriched Gas (Air v. Oxygen) Stream

| Feed | % Oxygen | Conductivity ($\mu$mhos/cm) |
|---|---|---|
| Control Black | 6.8 | 1785 |
| Unscrubbed Air | 7.6 | 1450 |
| Unscrubbed Air | 6.6 | 1200 |
| Unscrubbed Air | 7.0 | 1407 |
| Unscrubbed Oxygen | 7.4 | 730 |

The results clearly indicate that use of oxygen as a feed gives favorable conductivity measurements. As a practical matter, use of oxygen entails certain safety and cost disadvantages in most commercial environments; however, given the reduction in conductivity, many of these problems may be overcome.

COMPARATIVE EXAMPLE 2

Carbon blacks were treated with a stream of ozone—enriched air. This gas stream was "water scrubbed" in accordance with the invention. 3.60 liters per minute of ozone—enriched air was scrubbed through 300 cubic centimeters of water. The scrubber used to remove the $N_2O_5$ was a pyrex gas washing bottle with a fritted sparger. The effective residence time was about five seconds.

TABLE B

R5000 Carbon Black Resulting from
Water-Scrubbed Ozone-Enriched Air Stream

| Description | % Oxygen | Conductivity (μmhos/cm) |
|---|---|---|
| Control Black | 6.8 | 1785 |
| Unscrubbed Ozone | 7.0 | 1407 |
| Scrubbed$_{Water, 300 cc}$ Ozone | 9.3 | 690 |
| Scrubbed$_{Water, 300 cc}$ Ozone | 9.4 | 680 |
| Scrubbed$_{Water, 300 cc}$ Ozone | 7.1 | 580 |
| Scrubbed$_{Water, 300 cc}$ Ozone | 4.4 | 280 |
| Scrubbed$_{Water, 300 cc}$ Ozone | 5.8 | 425 |

The average conductivity of the five carbon blacks treated with a water—scrubbed ozone—enriched air stream was 531 μmhos/cm. Compared to the treatment with the unscrubbed ozone—enriched air stream, the average conductivity reduction is approximately 60%.

To determine the amount of scrubber/water contact required, a test identical to that performed above was performed with a scrubber volume of only 100 cubic centimeters.

TABLE C

R5000 Carbon Black Resulting from
Water-Scrubbed Ozone-Enriched Air Stream

| Description | % Oxygen | Conductivity (μmhos/cm) |
|---|---|---|
| Control Black | 6.8 | 1785 |
| Scrubbed$_{Water, 300 cc}$ Ozone | 7.1 | 580 |
| Scrubbed$_{Water, 100 cc}$ Ozone | 6.7 | 761 |
| Scrubbed$_{Water, 100 cc}$ Ozone | 6.8 | 610 |
| Scrubbed$_{Water, 100 cc}$ Ozone | 6.6 | 650 |

The conductivity values obtained using a 100 cubic centimeter scrubber volume (i.e., resulting in a shorter contact time) are higher than those obtained using the greater scrubber volume (i.e., resulting in a longer contact time). Specifically, the average conductivity obtained using the 100 cc scrubber volume, 674 μmhos/cm, is approximately 16% higher than that obtained using the 300 cc scrubber volume. Clearly, this suggests that there is a benefit to increased contact time. However, it is noteworthy that the average conductivity values obtained are still quite low.

It is known that ozone decomposes in aqueous solutions much more rapidly than it does in gaseous environments. However, experiments have indicated that, over contact times spanning approximately 16 seconds, under ordinary process conditions, ozone decomposition in water was minimal.

TABLE D

Ozone Scrubber Volume and Contact Time

| Lab Scrubber Vol. (cc) | Time (sec) | North Bend Scrubber Vol. (gal) |
|---|---|---|
| 300 | 5.0 | 538 |
| 100 | 1.7 | 182 |
| 50 | .83 | 90 |

Table D shows the relationship between the ozone scrubber volume and the contact time. Typically the carbon/ozone ration is 5/1. Calculations for Table D were performed as follows:

Laboratory Ozone Generator Flow Rate: 3.6 1/min
Laboratory Scrubber Volume: 300 cc
Residence Time in Lab Scrubber:

$$\frac{3.1}{3.6 \text{ 1/min}} = .083 \text{ min} = 5.0 \text{ sec}$$

North Bend Ozone Generator Flow Rate: 867 SCFM
North Bend Scrubber Volume (at 5 sec residence time):

$$\frac{(867 \text{ ft}^3)}{\text{min}}(0.083 \text{ min}) = 71.9 \text{ ft}^3 = 538 \text{ gal}$$

COMPARATIVE EXAMPLE 3

To determine the effect of using a water—scrubbed ozone—enriched air stream on color development, carbon black samples were treated with scrubbed v. unscrubbed ozone—enriched air. These samples were then exposed overnight to approximately 70% relative humidity at 23° C. to produce moisture levels on the blacks consistent with that found on commercial grade color blacks, such as Raven™ 5000 U-II. The carbon black treated with the unscrubbed ozone—enriched air had a moisture content of 12.48%; the carbon black treated with the scrubbed ozone—enriched air had 12.47% moisture.

TABLE E

Color Performance of Carbon Blacks Treated With
Scrubbed v. Unscrubbed Ozone-Enriched Air
(D65 Illuminant; 0.45 Geometry; Hunter Color Math)

| Treatment | L | a | b | ΔL | Shades Darker |
|---|---|---|---|---|---|
| Sherwin Williams Acrylic-Melamine | | | | | |
| Scrubbed Ozone | 2.78 | 0.05 | −0.32 | | |
| Unscrubbed Ozone | 2.69 | 0.10 | −0.20 | −0.09 | 1.5 |
| Nitrocellulose | | | | | |
| Scrubbed Ozone | 5.27 | −0.00 | −0.22 | −0.58 | 9.5 |
| Unscrubbed Ozone | 5.85 | −0.01 | −0.35 | | |

The carbon black exposed to the unscrubbed ozone—enriched air produced slightly darker masstone (approximately 1.5 shades), but was browner in undertone, than the carbon black treated with the scrubbed ozone—enriched air. Evaluation of shades was based upon the observation that 1 shade difference in masstone between samples as witnessed by an observer corresponds to a 0.06 L value difference between the samples; hence, shades in Table D are calculated using the following formula:

$$\text{Shades Different} = \frac{\Delta L}{0.06}$$

The color evaluation produced more dramatic differences. The carbon black treated with the scrubbed ozone—enriched air was much darker, but exhibited slightly more brown undertone, than the carbon black treated with the unscrubbed ozone—enriched air. The dramatic difference in color performance between the two resin systems suggests enhanced sensitivity of the nitrocellulose system to differences in nitrate content.

Scrubbing the ozone—enhanced air prior to treatment removes $N_2O_5$ which would otherwise ultimately form extractable acid species, such as $HNO_3$, on the carbon black. Resins within coating systems exhibit varying degrees of sensitivity to extractable acids such as $HNO_3$. The sensitivity of resins to extractable acids along with resin compatibility with carbon black can affect dispersion stability. Unstable dispersions, such as those containing extractable acids, generally produce less jet masstone. The greater the jetness of coatings produced with scrubbed ozone—enhanced air—treated carbon blacks suggests that the reduction in extractable acids improves the dispersion stability in both coating systems.

It is to be understood that the invention is not limited to the examples set forth herein. For a fuller understanding of the scope of the invention, reference should be made to the following claims.

What is claimed is:

1. A process for the oxidation of a carbon black which comprises the following steps:
    (a) producing a gas stream comprising air, and ozone in a concentration of less than about 4 percent by weight;
    (b) intimately scrubbing the produced gas stream with water for an interval of time, not more than about 16 seconds, sufficient to ensure reaction between the produced gas stream and the water;
    (c) contacting a carbon black with said scrubbed gas stream; and
    (d) recovering an oxidized carbon black therefrom.

2. The process of claim 1, wherein step (a) consists of subjecting a gas comprising air to a corona discharge.

3. The process of claim 1, wherein said scrubbing of step (b) is sufficient to remove nitrogen oxides to produce a scrubbed gas stream substantially free of nitrogen oxides.

4. The process of claim 1 or 3, wherein said produced gas stream of step (a) comprises ozone in a concentration of about 1 percent by weight.

5. The process of claim 1, wherein said produced gas stream is scrubbed with water in step (b) for at least about 2 seconds.

6. A process for the oxidation of a carbon black which comprises the following steps:
    (a) producing a gas stream comprising air and ozone;
    (b) intimately scrubbing the produced gas stream with water for an interval of time, not more than out 16 seconds, sufficient to remove nitrogen oxides to produce a scrubbed gas stream substantially free of nitrogen oxides;
    (c) contacting a carbon black with said scrubbed gas stream; and
    (d) recovering an oxidized carbon black therefrom.

7. The process of claim 6, wherein step (a) consists of subjecting a gas comprising air to a corona discharge.

8. The process of claim 6, wherein the scrubbed gas stream is essentially free of nitrogen pentoxide.

9. The process of claim 6 or 8, wherein said produced gas stream of step (a) comprises ozone in a concentration of about 1 percent by weight.

10. The process of claim 6, wherein said produced as stream is scrubbed with water in step (b) for at east about 2 seconds.

11. An ozone—oxidized carbon black having an average particle size of from about 6 nm to about 30 nm, as measured by Transmission Electron Microscopy/Automated Image Analysis, ASTM 3849, method and having an electrical conductivity of less that about 700 $\mu$mhos/cm.

12. The carbon black of claim 11 having an electrical conductivity of less than about 600 $\mu$mhos/cm.

13. The carbon black of claim 11 having a Nigrometer index, ASTM D 3265, of from about 60 to about 80.

14. In a process of oxidizing a carbon black by subjecting an air stream to a corona discharge to render an ozone—enriched air stream and then contacting said ozone—enriched air stream with said carbon black, the improvement comprising first intimately admixing said ozone—enriched air stream containing ozone, in concentration of less than about 4 percent by weight, with water for a discrete interval of time, not more than about 16 seconds, to remove nitrogen oxides to produce a scrubbed air stream substantially free of nitrogen oxides, which water scrubbed air stream then contacts the carbon black.

15. The process of claim 14, wherein said ozone—enriched air stream comprises ozone in a concentration of less than about 4 percent by weight.

16. The process of claim 14, wherein said admixing with water is performed over an interval of time of at least about 2 seconds.

\* \* \* \* \*